United States Patent [19]

Force

[11] 4,259,459

[45] Mar. 31, 1981

[54] TREATMENT OF LATEX EMULSIFIERS

[75] Inventor: Carlton G. Force, Mt. Pleasant, S.C.

[73] Assignee: Westvaco Corporation, New York, N.Y.

[21] Appl. No.: 152,045

[22] Filed: May 21, 1980

Related U.S. Application Data

[63] Continuation-in-part of Ser. No. 73,685, Sep. 10, 1979, abandoned, which is a continuation-in-part of Ser. No. 70,130, Aug. 27, 1979, abandoned.

[51] Int. Cl.$^3$ ............................................. C08L 93/00
[52] U.S. Cl. ................................. 525/154; 260/97.5; 528/230
[58] Field of Search ...................... 260/97.5; 525/154; 528/230

[56] References Cited

U.S. PATENT DOCUMENTS

| | | | |
|---|---|---|---|
| 2,311,386 | 2/1943 | Hasselstrom et al. | 260/97.5 |
| 2,407,248 | 9/1946 | Borglin | 260/106 |
| 2,409,173 | 10/1946 | Webb | 260/104 |
| 2,494,550 | 1/1950 | Hampton | 260/106 |
| 2,497,882 | 2/1950 | Hampton | 260/106 |
| 2,503,238 | 4/1950 | Gayer | 260/100 |
| 2,503,268 | 4/1950 | Hasselstrom et al. | 260/97.5 |
| 2,617,792 | 11/1952 | Floyd | 260/97.5 |
| 2,744,889 | 5/1956 | Gayer et al. | 260/97.5 |
| 2,794,017 | 5/1957 | Palmer et al. | 260/99.5 |
| 3,980,630 | 9/1976 | Ishiaami et al. | 260/97.5 |

OTHER PUBLICATIONS

Roberts et al., *Basic Principles of Organic Chemistry*, WA Benjamin, Inc., N.Y., 1964, p. 1109.

*Primary Examiner*—Maurice J. Welsh
*Attorney, Agent, or Firm*—Richard L. Schmalz; Terry B. McDaniel; Ernest B. Lipscomb, III

[57] ABSTRACT

An improved polymerization emulsifier for use in the manufacture of synthetic rubber is prepared wherein a mixture of tall oil fatty acids and resin acids as found in crude or distilled tall oil is disproportionated to reduce the amount of abietic type acids and linoleic type acids and treated with acid catalyzed formaldehyde or paraformaldehyde. The disproportionation and aldehyde treatment can occur in sequence or simultaneously. Emulsifiers prepared by the invention process minimize prefloc in latex production and improve rubber physicals.

10 Claims, No Drawings

TREATMENT OF LATEX EMULSIFIERS

This application is a continuation-in-part of co-pending application Ser. No. 073,685, filed Sept. 10, 1979 now abandoned, which application is a continuation-in-part of parent application Ser. No. 070,130, filed Aug. 27, 1979, now abandoned.

BACKGROUND OF THE INVENTION (1) Field of the Invention

The present invention relates to emulsion polymerization emulsifiers and methods of treating a mixture of tall oil fatty acids and resin acids such as found in crude or distilled tall oil with acid catalyzed formaldehyde or paraformaldehyde for use in emulsion polymerization. The improved emulsifier may be used to prepare polymers such as synthetic rubber by emulsion polymerization of monomers such as butadiene, styrene, etc.

(2) Description of the Prior Art

Tall oil is a natural mixture of resin acids and fatty acids, together with unsaponifiable materials, which is obtained by acidifying the black liquor skimmings of the sulfate process of wood pulp manufacture, using resinous woods such as pine. The composition of tall oil varies somewhat depending upon such factors as the species of the wood which was pulped. Crude tall oil acids will generally contain 18% to 60% fatty acids, 28% to 66% resin acids and 3% to 24% unsaponifiable materials. For the purpose of this invention, crude tall oil acids may be used; however, it is preferable to use distilled tall oil. The distillation may be carried out by introducing crude tall oil into a fractionation unit to separate the volatile fraction of crude tall oil from the non-volatile or pitch. Except for some separation of palmitic and more volatile acids in the first fraction, tall oil distillates have nearly the same composition as the crude tall oil. A typical tall oil distillate may contain from 25% to 66% resin acids, from 37% to 63% fatty acids and from 3% to 12% unsaponifiable materials. Various ratios of fatty acid to resin acid may be used including either the fatty acid fraction or resin acid fraction in addition to the mixed acids.

Various kinds of resin acids, such as abietic acid, palustric acid, levopimaric acid and neoabietic acid, include conjugated double bonds; and, hence these resin acids have high chemical activities. Consequently, it has been known that using alkali salt of the rosin which contains the resin acids, as emulsifier for production of synthetic rubber inhibits normal polymerization. Thus, when using rosin as an emulsifier for emulsion polymerization, it is necessary to convert the resin acid having conjugated diene structure to its derivative having no conjugated diene structure.

Polyunsaturated fatty acids, such as linoleic acid, linolenic acid and eleostearic acid, have more than one double bond in each molecular structure, as does rosin. It has been known that using polyunsaturated fatty acid containing an active methylene between nonconjugated double bonds as an emulsifier for emulsion polymerization may retard the polymerization reaction and inhibit normal progress of ordinary polymerization. When using fatty acid as an emulsion polymerization emulsifier, such fatty acid containing polyunsaturated fatty acid and mono-unsaturated fatty acid often is subjected to hydrogenation reaction so that the reaction is conducted on the polyunsaturated fatty acid to the utmost extent and not on the mono-unsaturated fatty acid. Suitable mild reaction conditions should be selected to acquire acceptable emulsifiers.

Several proposals have been made to reduce the large content of materials containing undesirable double bonds in free radical polymerization by disproportionation of the tall oil acids. In general, disproportionation is carried out by contacting tall oil with a catalyst and heating.

There are many processes in the prior art related to disproportionation reaction of tall oil in the presence of a catalyst. For examples: U.S. Pat. No. 2,617,792 discloses a method using nickel as a catalyst; U.S. Pat. Nos. 2,407,248, 2,409,173, 2,494,550, 2,497,882, and 2,503,238 disclose methods using sulfur as a catalyst; U.S. Pat. Nos. 2,311,386 and 2,503,268 disclose methods using iodine as a catalyst; U.S. Pat. No. 2,794,017 discloses a method using sulfur dioxide as a catalyst; and, more recently, U.S. Pat. No. 3,980,630 discloses a method of preparing an emulsion polymerization emulsifier comprising the steps of a disproportionation reaction of rosin, polyunsaturated fatty acid or a mixture thereof using iron iodide as a catalyst and then neutralizing the obtained product with alkali such as KOH or NaOH.

While such proposals have resulted in the repositioning of double bonds, soaps prepared from disproportioned tall oil have generally not given equivalent polymerization performance to the commonly employed partially hydrogenated-tallow fatty acid and disproportionated wood rosin soaps used in emulsion polymerization and have sometimes resulted in rubbers with appreciably lower physicals.

The lower rubber physicals in polymers produced by emulsion polymerization emulsifiers from disproportionated tall oil is often accompanied by reduced latex particle size in comparison to say a partially hydrogenated tallow—resin acid mix emulsifier. Latex production and processing are improved by producing larger, more colloidally stable rubber particles. One mechanism for accomplishing this desirable increase in latex particle size is the removal of trace impurities in the tall oil fatty acids or the mixture of tall oil fatty acids and tall oil resin acids (as in crude or distilled tall oil) which remain and which prematurely terminate the growth of individual polymer chains after disproportionation. Presumably, most of these impurities are phenolic residues from lignin which have boiling points in the tall oil range.

U.S. Pat. No. 3,528,959 teaches removal of these impurities by increasing their molecular weight by oligomerization with boron trifluoride catalyst. The crude or distilled tall oil is first disproportionated to the extent the abietic type acid content and the linoleic acid type content are reduced to less than 2% of the tall oil. This product is heated to from 149° C. to 177° C. in the presence of from 0.01% to 2.0% $BF_3$ for 30 minutes to one hour; then the temperature is rapidly raised to from 249° C. to 271° C. to prevent degradation of the product. It is recommended for best results to distill the $BF_3$ treated product (redistilling if the starting material was a tall oil distillate).

It has now been discovered that the disadvantageous impurities also can be deactivated in a mixture of disproportionated tall oil fatty acids and resin acids by cross-linking with formaldehyde or paraformaldehyde.

The treatment of rosin with formaldehyde is not new. U.S. Pat. No. 3,132,127 relates to improving the effectiveness of the reaction product of a rosin with formaldehyde as a raw material for the manufacture of rosin size by maintaining at a temperature of between 250° C. and 300° C. the reaction product of rosin with formaldehyde in the absence of an acid catalyst (at 135° C. to 250° C.) until the latent foaming tendency thereof has substantially decreased. U.S. Pat. No. 3,463,768 discloses that the darkening of product from using an acid catalyst and the decrease in acid number from subjecting rosin to elevated temperatures (above 250° C.) are decreased when the reaction of rosin with formaldehyde is performed in two steps. In the first step, the rosin is reacted with formaldehyde between 130° C. and 200° C. in the absence of any strong acid. In the second step, an acid dehydration catalyst is added; and the reaction temperature is maintained between 150° C. and 220° C. until dehydration of the methylol groups has substantially ceased.

U.S. Pat. No. 3,681,268 discloses mastic adhesive compositions which comprise relative proportions by weight of: 100 parts of a rubber selected from the group consisting of reclaim, natural, styrenebutadiene rubbers; 50 to 200 parts by weight of a zinc salt of the formaldehyde modified rosin from reacting 2 to 10 parts by weight of formaldehyde with 100 parts by weight of molten rosin; and a hydrocarbon vehicle for the rubber.

Also, U.S. Pat. No. 3,207,743 teaches treatment of fatty acids or their esters with formaldehyde in the presence of an acid catalyst prior to epoxidation to provide plasticizers for polyvinyl chloride with improved color.

However, none of the prior art teaches acid-catalyzed formaldehyde treatment of emulsion polymerization emulsifiers from a mixture of tall oil fatty acids and resin acids.

SUMMARY OF THE INVENTION

It has been found that emulsifiers from mixtures of tall oil fatty acids and resin acids, such as found in crude or distilled tall oil, when treated with one of two acid catalyzed aldehydes, either formaldehyde or paraformaldehyde, will produce latexes of larger particle size than the untreated emulsifier. This increase in particle size makes the latex more colloidally stable for easier handling in processing and formation of less coagulum, commonly called prefloc, in processing equipment such as butadiene blow down tanks and styrene stripping columns.

The preferred aldehyde is formaldehyde. A preferred catalyst for the treatment is the iodine utilized as the catalyst for disproportionation. Apparently the iodine or hydriodic acid generated from it in the disproportionation is adequate to catalyze the formaldehyde or paraformaldehyde treatment. It is not necessary to distill the treated product to achieve the desired latex particle size increase. Other catalysts such as $H_2SO_4$ or p-toluene sulfonic acid may also be used, but may need to be separated from the product to prevent harmful effects like corrosion.

DESCRIPTION OF THE PREFERRED EMBODIMENT

In the preferred embodiment of the invention a tall oil distillate containing a mixture of fatty acids and resin acids is disproportionated by contacting with a catalyst and heating to a temperature of from 160° C. to 271° C. for 1 to 4 hours. Of the several disproportionation catalysts mentioned above, iodine is preferred and is employed in an amount from 0.1% to 1.0%. Essentially, during a disproportionation reaction, hydrogen is removed from some of the components and transferred to other components. The disproportionated product becomes a stabilized mixture of dehydrogenated and hydrogenated components.

When iodine is to be the catalyst for the formaldehyde treatment, the reaction is allowed to cool to from 25° C. to 100° C. and from 0.038% to 3.8% formaldehyde (0.1% to 10% of 38% formaldehyde solution) is added. Then the temperature is increased above the boiling point of water, preferably to from 104° C. to 232° C. over a period of from 15 minutes to 1 hour and held within that temperature range up to 2 hours. Next, the reaction is steam sparged for from 2 to 3 hours to remove the residual iodine.

Although not necessarily required to obtain maximum particle size, distillation after the formaldehyde treatment can be performed. The reaction product is distilled at from 0.05 to 50 mm. Hg.

Alternatively, when other than the residual iodine from disproportionation is the catalyst of choice, such as sulfuric acid, the disproportionated product is steam sparged for up to 2 hours at the temperature of the disproportionation reaction.

After cooling to from 25° C. to 100° C., the sparged product is reacted with from 0.1% to 10% of 38% formaldehyde solution in the presence of from 0.05% to 1.0% of sulfuric acid catalyst. The formaldehyde is slowly added over a period from 15 minutes to one hour. Then the mixture is heated to from 125° C. to 175° C. and allowed to react for from 30 minutes to 2 hours. As with iodine as the catalyst, the product alternatively may be distilled under from 0.05 to 0.5 mm. Hg. pressure.

Illustration of the practice of the invention is presented in the following examples.

EXAMPLE 1

A one gallon reactor kettle was charged with 7.0 lbs. of distilled tall oil containing 28% resin acids, 68% fatty acids and 4% unsaponifiable material and 6.33 grams (0.2%) iodine. The system took one hour to heat to 252° C. It was held at this temperature for 2 more hours. The reaction was cooled to 74° C. and 1,000 grams of product was removed from the kettle and labeled "Emulsifier A." To the remaining material in the reactor was added 21.7 grams of 38% formaldehyde solution. The temperature was increased to 149° C. over a 25-minute period and was held for one hour. Steam was then turned on and the reaction was sparged 2 hours and 25 minutes at 149° C. This product was labeled "Emulsifier B."

A 300-gram sample of this final kettle product was distilled at 0.2 mm. Hg. pressure to give 84.9% product, 5.2% heads and 9.9% residue. This distilled, formaldehyde-treated disproportionated product was labeled "Emulsifier C."

In the laboratory, 650 grams of the 1,000 grams removed from the kettle before the formaldehyde addition was steam sparged 1½ hours at 252° C. in a one-liter 3-neck flask equipped with a stirrer, fritted glass tube extending near the bottom of the flask and a three-way adaptor to direct any escaping vapors downward at a 45-degree angle into a hood ventilation system. A thermometer was inserted into the flask through the upright arm of the adaptor to monitor the reaction temperature. For drying, the steam came through the upper legs of two glass Y's in series in the inlet line and any condensate drained from the lower legs.

Three hundred-fifty (350) grams of lab sparged product were reacted with 3.5 grams of 38% formaldehyde catalyzed with 0.35 gram $H_2SO_4$. The sulfuric acid was added to the mixed tall oil acids and held at 75° C. in a 3-neck flask equipped with a stirrer, thermometer and condenser. This was followed by the formaldehyde added over a 30-minute period through the condenser. The material was then heated to 150° C. and allowed to react for one hour. Three hundred (300) grams of the product was distilled under 0.3 mm. Hg. pressure to yield 79% product, 5% heads and 16% residue. This product was labeled "Emulsifier D."

Following the procedure outlined in Symposium Series 24: 122 (1976) (substituting 76 parts butadiene and 24 parts styrene for the 100 parts butadiene in the recipe), latex emulsions were made using Emulsifiers A, B, C and D; and the latex particle sizes produced by emulsion polymerization were determined from the polymerization rates. The results are shown in Table I.

TABLE I

| | Effect on Latex Particle Size of Formaldehyde ($CH_2O$) Treatment | | |
|---|---|---|---|
| Emulsifier | Catalyst | Distilled | Latex Particle Diameter in A |
| A | Untreated | — | 342 |
| B | Disproportionation | No | 374 |
| C | Disproportionation | Yes | 366 |
| D | $H_2SO_4$ | Yes | 375 |

EXAMPLE 2

Latex emulsifiers were prepared as in Example 1 by formaldehyde treating a disproportionated, distilled tall oil containing 38% resin acids, 54% fatty acids and 8% unsaponifiables in the presence of either the disproportionation catalyst ($I_2$) or sulfuric acid. As in Example 1, latex emulsions were prepared using these emulsifiers, referred to as "mixed acids," and the latex particle sizes produced were determined. Table II below compares these results with the latex particle sizes produced by polymerized latex emulsions prepared with mixed acid emulsifiers not subjected to the formaldehyde treatment and by polymerized emulsions prepared using an emulsifier mixture referred to as "plant mix." The plant mix emulsifier was made up of 48% partially hydrogenated tallow and 52% of a distilled tall oil containing 75% resin acids, 16% fatty acids and 9% unsaponifiables. Thus, the plant mix contained substantial quantities of saturated fatty acids.

TABLE II

| Effect on Latex Particle Size of Formaldehyde ($CH_2O$) Treatment | | | | |
|---|---|---|---|---|
| Polymerization Run | Emulsifier | Catalyst | Distilled | Latex Particle Diameter in A |
| 7 | Plant Mix | — | — | 838 |
| | Mixed Acids | — | — | 690 |
| | Mixed Acids | $H_2SO_4$ | Yes | 859 |
| 16 | Plant Mix | — | — | 581 |
| | Mixed Acids | $H_2SO_4$ | No | |
| | | Disproportionation | No | 643* |
| | Mixed Acids | $H_2SO_4$ | Yes | |
| | | $H_2SO_4$ | Yes | 560* |
| 19 | Plant Mix | — | — | 659 |
| | Mixed Acids | $H_2SO_4$ | No | |
| | | Disproportionation | No | 773* |

*Treated emulsifiers were blended prior to forming emulsion and polymerizing.

The data from polymerization run 7 indicate the formaldehyde treated mixed acid emulsifier resulted in a larger latex particle size than either the plant mix (tal-low-rosin) emulsifier or the untreated mixed acid emulsifier.

The data from polymerization runs 16 and 19 indicate there is no particular advantage in distilling the formaldehyde treated mixed acid product.

EXAMPLE 3

This example shows that larger, more colloidally stable rubber particles may also be prepared by the invention process when the disproportionation catalyst and aldehyde-treatment agent are added to the mixture of fatty and resin acids at the same time.

To forty-one pounds of the distilled tall oil of Example 1 were added 37.23 grams of iodine and 186.14 grams of 37% formaldehyde solution in a ten gallon reactor. The system was closed and heated to 252° C. over a period of 62 minutes, venting periodically to maintain a pressure not exceeding 50 p.s.i. After being held at this temperature for two hours, the system was vented to 5 p.s.i. and then steam sparged for one and a half hours at 8 p.s.i. The system was then cooled to about 82° C. and the disproportionated, formaldehyde-treated material was collected.

As in Examples 1 and 2, latex emulsions were made using this prepared mixed acid emulsifier, and the latex particle sizes produced were determined. These latex particle sizes are presented in Table III in comparison to latex particle sizes produced from emulsions made with the plant mix described in Example 2.

TABLE III

| Effect on Latex Particle Size of Simultaneous Disproportionation and Formaldehyde Treatment | | |
|---|---|---|
| Polymerization Run | Emulsifier | Latex Particle Size (Diameter in A) |
| 9 | Plant Mix | 687 |
| | Mixed Acid | 755 |
| 12 | Plant Mix | 537 |
| | Mixed Acid | 611 |
| 13 | Plant Mix | 581 |
| | Mixed Acid | 633 |
| 22 | Plant Mix | 466 |
| | Mixed Acid | 495 |

Thus, in each run, the emulsifier material produced by simultaneously disproportionating and formaldehyde treating the mixture of fatty and resin acids resulted in a larger particle size in the emulsion polymerization as compared to the industry standard emulsifier, represented no "plant mix."

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

I claim:

1. In a process for treating mixtures which are useful as emulsion polymerization emulsifiers, the mixtures comprising tall oil fatty acids and resin acids, wherein the mixtures have been subjected to disproportionation, the improvement which comprises, reacting the disproportionated mixtures with from 0.038% to 3.8% of an aldehyde selected from the group consisting of formaldehyde and paraformaldehyde in the presence of a catalytic amount of an acidic catalyst, wherein the catalyst is selected from the group consisting of iodine, hydriodic acid, sulfuric acid and p-toluene sulfonic acid at a temperature of from 25° C. to 100° C. for from 15 minutes to 1 hour, the temperature subsequently being raised to from 125° C. to 175° C. for from 30 minutes to 2 hours.

2. The process of claim 1 wherein the mixture of tall oil fatty acids and resin acids is selected from the group consisting of crude tall oil and tall oil distillate.

3. The process of claim 1 wherein the mixture of tall oil fatty acids and resin acids is from 37% to 63% tall oil fatty acids and from 25% to 66% resin acids.

4. A process for producing a rubber emulsifier which comprises disproportionating tall oil in the presence of from 0.1% to 1% iodine at a temperature of from 160° C. to 271° C. for from one to four hours, allowing the product to cool, reacting the disproportionated tall oil with from 0.038% to 3.8% of an aldehyde selected from the group consisting of formaldehyde and paraformaldehyde in the presence of the iodine present from the disproportionation reaction by raising the temperature to from 104° C. to 232° C. over a period of from 15 minutes to 1 hour and maintaining the temperature range up to 2 hours.

5. The process of claim 4 wherein the tall oil is distilled tall oil.

6. The process of claim 4 or 5 wherein the formaldehyde treated disproportionated tall oil product is subjected to distillation.

7. The process of claim 4 wherein the reaction product is steam sparged for from 2 to 3 hours.

8. A process for producing a rubber emulsifier which comprises reacting a mixture of fatty acids and resin acids with from 0.1% to 1% iodine and from 0.038% to 3.8% of an aldehyde selected from the group consisting of formaldehyde and paraformaldehyde at a temperature of from 160° C. to 271° C. for from one to four hours.

9. The process of claim 8 wherein the reaction product is steam sparged for up to 2 hours under up to 10 p.s.i. at a temperature of from 160° C. to 271° C.

10. The process of claim 8 or 9 wherein the reaction temperature is 252° C.